United States Patent [19]
Zwikstra

[11] Patent Number: 5,151,292
[45] Date of Patent: Sep. 29, 1992

[54] FATBLEND AND PROCESS OF PRODUCING

[75] Inventor: Nico Zwikstra, Heemstede, Netherlands

[73] Assignee: Van den Bergh Foods Co., Division of Conopco Inc., Lisle, Ill.

[21] Appl. No.: 818,420

[22] Filed: Jan. 6, 1992

Related U.S. Application Data

[63] Continuation of Ser. No. 454,336, Dec. 21, 1989, abandoned.

[51] Int. Cl.$^5$ .............................................. A23D 9/00
[52] U.S. Cl. .................................... 426/601; 426/306; 426/607
[58] Field of Search ........................ 426/601, 607, 306

[56] References Cited

U.S. PATENT DOCUMENTS

| | | | |
|---|---|---|---|
| 2,972,541 | 2/1961 | Cochran et al. | 426/607 |
| 4,410,557 | 10/1983 | Miller | 426/607 |
| 4,486,457 | 12/1984 | Schijf | 426/607 |

OTHER PUBLICATIONS

Gunstone et al., The Lipid Handbook, London, New York, Chapman and Hall, pp. 63, 78, 88, 89.

*Primary Examiner*—Jeanette Hunter
*Assistant Examiner*—Helen Pratt
*Attorney, Agent, or Firm*—Rimma Mitelman

[57] ABSTRACT

Fatblends for chocolate compositions, the blends containing a mixture of a mid-fraction of hardened, fractionated soy bean oil and a mid-fraction of hardened, fractionated cottonseed oil, wherein the ratio of the two mid-fractions $$\frac{BO}{CS}$$

is less than 1.0.

14 Claims, No Drawings

FATBLEND AND PROCESS OF PRODUCING

This is a continuation or application of Ser. No. 07/454,336, filed Dec. 21, 1989, now abandoned.

BACKGROUND AND SUMMARY OF THE INVENTION

A flatblend, that contains mid-fractions of both hardened and fractionated soy bean oil and cottonseed oil are known. A commercial product, Kaomel from Unilever, contains the mid-fractions mentioned above. This product already shows a reasonable to good gloss-retention of chocolate coatings, when used in it. We have now found a new fatblend, that provides an even better gloss-retention when used in chocolate coatings.

Thus our invention concerns in the first place fatblends, comprising a mid fraction of hardened fractionated soy bean oil and a mid fraction of hardened, fractionated cottonseed oil, wherein the weight ratio of the two mid-fractions $$\frac{BO}{CS}$$

is less than 1,0, preferably this ratio is 10:90–40:60, most preferred is a ratio of 25:75–35:65.

By using these blends in chocolate coatings can be obtained with excellent gloss-retention, whereas the N-values of these blends are according to the standards, required for such blends. Especially the $N_{30}$ and $N_{35}$ values, which are very important, are in accordance with these standards.

Because of the excellent gloss-retention of our composition it is no longer necessary to add an emulsifier to the composition in order to improve the gloss-retention.

Sometimes it is helpful, e.g. when the hardness of the blend needs to be corrected, to add some (up to 15 wt %, preferably 2–8 wt %) of the olein fraction, that is obtainable by the fractionation of a blend of hardened soy bean oil and hardened cottonseed oil, to the fatblend. Soybean oil and cottonseed oil from every source can be used to prepare our mid-fractions. The best fatblends are obtained, when these blends contain a relatively high amount of trans-hardened oils. These trans-hardened oils are obtained, when the hardening of the oils is carried out, e.g. with a sulfidised Ni-catalyst, e.g. Pricat 9908' which contains about 0.1–0.2 wt % Ni and which is used at pressures of about 1 bar and temperatures of about 150°–250° C. This way hardened oils can be obtained that consist of more than 40% of trans-hardened oils.

The fractionation product is obtained by wet fractionation. The solvents normally used are hexane and acetone. When acetone is used the fractionation is carried out by using more than 3 vol units acetone per weight unit of oil (so: e.g. 5 l acetone per 1 kg oil).

The fractionation is carried out by mixing the ingredients (oil mixture) with acetone of 35° C. or more in the appropriate ratio. The mixture is cooled to about −15° to +15° C., e.g. 0° C. At this temperature a crystallised product can be separated from a supernatent liquid e.g. by filtering or centrifugation. The solid so obtained is mixed again with acetone of 35° C. or more until a solution is obtained. This solution is cooled to a temperature of 16°–24° C., depending on the product that is desired. Here again a solid product will be formed, that can be separated from a liquid acetone containing fraction. After working up of the acetone fraction, by removing the acetone, the required mid-fraction is obtained.

The compositions according to the invention can be obtained in different ways. The preferred way consists of making a blend of unhardened soybean oil and cottonseed oil, hardening this blend in the way described above, wet fractionating the hardened product as described above, whereupon the desired product is obtained. However in another embodiment the soybean oil and cottonseed oil are treated separately. This way two mid-fractions are obtained after the wet fractionations. These fractions can be admixed to give the required product. In another sequence the two unhardened oils can be hardened separately, after which the hardened oils are combined and wet-fractionated as a blend.

Of course also chocolate coatings and food products containing the blends of the invention are part of the invention.

DETAILED DESCRIPTION OF THE INVENTION

Example I

A blend was made of 30 parts by weight of soybean oil and 70 parts by weight of cottonseed oil. This blend was hardened using a Ni-catalyst (0.1 wt % Ni), which was sulfidised, at 1 bar and 195° C.

The product of the hardening was wet-fractionated by adding 500 vol. parts of acetone, which had a temperature of 43° C. After cooling to 0° C. and filtering a solid fraction was removed (60 parts by weight). To the solid fraction acetone was added and this fraction was warmed up to 43° C. Cooling again, now to 20° C. and filtering gave a solid fraction (22 parts by weight) and an acetone fraction. After removal of the acetone a mid-fraction (38 parts by weight) was obtained. The properties and analytical data of the products obtained are mentioned in the tables I (for the trans-hardened blends) and II (for the blend of midfractions).

Example II

Example I was repeated. The ratio BO:CS however was 40 BO: 60 CS. The data of the products are mentioned in the tables I and II. The amount of mid-fraction obtained was 41 parts by weight.

TABLE I

| Properties and analysis of trans-hardened blend | | |
|---|---|---|
| BO | 40 | 30 |
| CS | 60 | 70 |
| N20 | 63 | 65 |
| N25 | 48 | 51 |
| N30 | 30 | 33 |
| N35 | 12 | 16 |
| N40 | 1.0 | 0.4 |
| Slip m. pt °C. | 37.3 | 38.0 |
| I.V. | 70.1 | 66.7 |
| Fame | | |
| C12 | 0.5 | 0.5 |
| C16 | 17.8 | 18.9 |
| C18:0 | 7.8 | 9.1 |
| C18:1 | 73.6 | 69.6 |
| Carbon Nos. | | |
| C48 | 0.9 | 1.5 |
| C50 | 10.6 | 11.9 |
| C52 | 35.8 | 36.9 |
| C54 | 50.5 | 47.0 |
| C56 | 1.6 | 1.8 |

TABLE II

| | Properties and analysis of fractionated blend (mid-fraction) | | | | |
|---|---|---|---|---|---|
| BO | 40 | | 30 | | acc to |
| CS | 60 | | 70 | | standard |
| N-values | ns | s* | ns | s* | ns |
| N20 | 92.9 | 83.7 | 90.0 | 80.2 | 86–96 |
| N25 | 79.3 | 77.9 | 75.8 | 73.1 | |
| N30 | 48.2 | 58.7 | 44.2 | 53.9 | 41–49 |
| N35 | 6.2 | 10.5 | 5.0 | 7.3 | max. 8 |
| N40 | 0 | 0 | 0 | 0 | |
| s* = stab 40 h/26° C. slip | | | | | |
| mp. °C. | 35.3 | | 34.6 | | 33–35 |
| I.V. | 65.6 | | 64.1 | | 57–60 |
| Fame | | | | | |
| C14 | 0.4 | | 0.6 | | |
| C16 | 19.7 | | 19.9 | | |
| C18:0 | 7.1 | | 8.1 | | |
| C18:1 | 71.4 | | 69.4 | | |
| Carb. Nos. | | | | | |
| C48 | 0.8 | | 1.1 | | |
| C50 | 10.6 | | 11.3 | | |
| C52 | 42.2 | | 42.4 | | |
| C54 | 44.1 | | 42.4 | | |
| C56 | 1.6 | | 1.7 | | |

Example III

Example I was repeated. But this time 90 parts by weight of the obtained mid-fraction was blended with 10 parts by weight of the oleine fraction obtained after removing the acetone of the liquid fraction, where from the solid fraction was removed. This product processessed the following N-values:

| | NS | acc. to stand |
|---|---|---|
| N 20 | 79.8 | 77–87 |
| N 25 | 60.0 | 60–66 |
| N 30 | 31.0 | 29–35 |
| N 35 | 2.5 | max. 2.5 |

What is claimed is:

1. Fatblend, useful in chocolate compositions, comprising a mid-fraction of hardened, fractionated soybean oil, BO, and a mid-fraction of hardened, fractionated cottonseed oil, CS, wherein the weight ratio BO/CS of the two mid-fractions is 10:90–40:60.

2. Fatblend, according to claim 1, wherein the ratio of the mid-fractions is 25:75 to 35:65.

3. Fatblend, according to claim 1, wherein the blend also contains up to 15 wt % of the olein-fraction, obtainable by fractionation of a blend of hardened soybean oil and hardened cottonseed oil.

4. Fatblend according to claim 3, wherein the blend contains 2–8 wt % of the olein-fraction, obtainable by fractionation of a blend of hardened soybean oil and hardened cottonseed oil.

5. Fatblend, according to claim 1, wherein the hardened oil is obtained by a catalytic hardening process that leads to a product with more than 40% trans-hardened oil.

6. Fatblend, according to claim 1, wherein the mid-fraction of fractionated oil is obtained by wetfractionation of the hardened fat with acetone.

7. Fatblend, according to claim 1, comprising two separately obtained mid-fractions of hardened and fractionated soybean and cottonseed oil.

8. Fatblend according to claim 1, comprising a mid-fraction, obtained by a combined hardening and fractionation of a blend of soybean oil and cottonseed oil.

9. Chocolate coating with improved gloss-retention, which contains a fatblend according to claim 1.

10. Chocolate products, containing a coating as claimed in claim 9.

11. Process for the preparation of a fat blend comprising hardening catalytically soybean oil, cottonseed oil or a mixture thereof, wet-fractionating the hardened product or products either separately or combined, separating mid-fraction(s), and where more than one mid-fraction are obtained, mixing them, so that a fat blend with a weight ratio of soybean oil components:-cotton seed oil components of less than 1.0 is recovered.

12. Process according to claim 11, wherein the catalytic hardening is carried out with a sulfidised Ni-catalyst.

13. Process according to claim 11, wherein the wet-fractionation is carried out with acetone in a ratio of more than 3 vol. units acetone per weight unit of oil.

14. Process according to claim 11, wherein the following steps are carried out in the fractionation step: mixing of the components including acetone at a temperature above 35° C., cooling the mixture to −15° to +15° C., separating the mixture and separating a solid fraction, dissolving this solid fraction at a temperature above 35° C. in acetone, cooling again to 16°–24° C., separating and working up the acetone fraction in order to collect the required mid-fraction.

* * * * *